US009885197B2

(12) United States Patent
Pettlon, II et al.

(10) Patent No.: US 9,885,197 B2
(45) Date of Patent: Feb. 6, 2018

(54) LIGHTNING PROTECTION AND SAFETY RAIL SYSTEM

(71) Applicants: Kenneth Ray Pettlon, II, Maryville, MO (US); Kristopher Aaron Pettlon, Maryville, MO (US)

(72) Inventors: Kenneth Ray Pettlon, II, Maryville, MO (US); Kristopher Aaron Pettlon, Maryville, MO (US)

( * ) Notice: Subject to any disclaimer, the term of this patent is extended or adjusted under 35 U.S.C. 154(b) by 423 days.

(21) Appl. No.: 14/267,485

(22) Filed: May 1, 2014

(65) Prior Publication Data
US 2015/0315810 A1 Nov. 5, 2015

(51) Int. Cl.
| H02G 1/02 | (2006.01) |
| E04H 17/22 | (2006.01) |
| H02G 13/00 | (2006.01) |
| E04F 11/18 | (2006.01) |
| E04H 17/00 | (2006.01) |
| E04H 17/14 | (2006.01) |

(52) U.S. Cl.
CPC .............. *E04H 17/22* (2013.01); *E04F 11/18* (2013.01); *H02G 13/00* (2013.01); *H02G 13/40* (2013.01); *H02G 13/80* (2013.01); *E04H 2017/006* (2013.01); *E04H 2017/146* (2013.01)

(58) Field of Classification Search
CPC ........ H02G 13/00; H02G 13/40; H02G 13/80; H02G 15/20; H02G 15/34; H02G 7/00; B64D 45/02; H01R 13/648; H01R 4/66; H05F 3/02; C25B 11/03; C25B 1/46; C25B 9/20; E04H 17/22; E04H 2017/006; E04G 21/3223; E04G 21/3233; H02B 13/00; H01B 7/29

USPC ............... 108/50.02; 174/2, 6, 371–373, 368
See application file for complete search history.

(56) References Cited

U.S. PATENT DOCUMENTS

| 1,633,098 A | * | 6/1927 | Heese | ..................... H02G 13/00 174/2 |
| 3,350,496 A | * | 10/1967 | Ritter | ..................... H02G 13/00 174/4 C |
| 3,904,932 A | * | 9/1975 | Langlie | ..................... H02H 9/06 174/2 |
| 5,285,195 A | * | 2/1994 | Way | ....................... A01K 3/005 256/10 |
| 5,312,089 A | * | 5/1994 | Venegas, Jr. | .......... E04F 11/181 256/19 |
| 5,431,372 A | * | 7/1995 | Kostelecky | ........... E01F 13/022 182/45 |
| 5,616,036 A | * | 4/1997 | Polidori | ................... H01R 4/60 248/74.1 |

(Continued)

*Primary Examiner* — Pete Lee
(74) *Attorney, Agent, or Firm* — Mashburn Law Office, LLC; Donna Denise Mashburn Chapman

(57) ABSTRACT

A lightning protection and safety rail system comprising a number of bases, vertical posts, horizontal rails, caps, mounting brackets, and lightning cables. The bases anchor the system to an elevated surface. The vertical posts extend upward from the bases. The horizontal rails extend between the vertical rails. The caps are positioned at tops of the vertical posts. The lightning cables are connected to the caps via the mounting brackets and are configured to be connected to an electrical ground. Lightning current travels from the caps, through the lightning cables, and to the electrical ground. Lightning current may also pass through the horizontal rails to a lightning cable attached to another cap.

14 Claims, 4 Drawing Sheets

(56) References Cited

U.S. PATENT DOCUMENTS

| | | | | |
|---|---|---|---|---|
| 6,142,434 | A * | 11/2000 | Trost | E04H 12/24 24/270 |
| 6,815,607 | B1 * | 11/2004 | Gingras | E04H 12/2215 174/6 |
| 7,802,773 | B2 * | 9/2010 | Murphy | E04G 21/3223 256/65.14 |
| 8,132,792 | B2 * | 3/2012 | Perris | E04G 21/3223 182/113 |
| 8,246,390 | B2 * | 8/2012 | Cecil | H01R 4/20 439/523 |
| 8,373,065 | B2 * | 2/2013 | Azuma | H02G 13/00 174/2 |
| 2004/0105211 | A1 * | 6/2004 | Chung | H02G 13/00 361/220 |
| 2006/0011901 | A1 * | 1/2006 | Anson | E01F 13/022 256/65.14 |
| 2009/0308630 | A1 * | 12/2009 | Chung | H02G 13/00 174/3 |
| 2011/0005150 | A1 * | 1/2011 | Berlee | E04G 21/3214 52/173.1 |
| 2011/0179744 | A1 * | 7/2011 | Smith | E04G 21/3223 52/745.05 |
| 2011/0186796 | A1 * | 8/2011 | Platt | B23P 17/04 256/65.14 |
| 2012/0020791 | A1 * | 1/2012 | Flemming | H02G 13/00 416/146 R |
| 2014/0191172 | A1 * | 7/2014 | Christoffer | E04H 17/22 256/21 |
| 2015/0123061 | A1 * | 5/2015 | Walters | E04H 17/1421 256/21 |

* cited by examiner

LIGHTNING PROTECTION AND SAFETY RAIL SYSTEM

BACKGROUND

The present invention relates to lightning protection devices and to safety rail devices.

Safety rail systems are used on rooftops and other elevated surfaces to prevent workers and other individuals from falling off of the roof. Lightning protection devices are used on rooftops to prevent damage to the building from lightning strikes. The safety rail systems and the lightning protection systems must each be specified, designed, purchased, and installed. This results in high costs to building owners to bring their buildings within building codes to ensure building safety.

SUMMARY

A lightning protection and safety rail system that allows lightning to be safely directed to an electrical ground and that prevents workers and other individuals from falling off of a rooftop or other elevated surface is provided.

One embodiment of the present invention is a lightning protection and safety rail system that includes a number of bases, vertical posts, connectors, horizontal midrails, horizontal toprails, caps, mounting brackets, and lightning cables. The bases anchor the system to the elevated surface and support the vertical posts. The vertical posts extend upwards from the bases and support the horizontal midrails and the horizontal toprails. The connectors secure the horizontal midrails and horizontal toprails to the vertical posts via fasteners. The horizontal midrails extend between middle portions of the vertical posts. The horizontal toprails extend between top portions of the vertical posts. The caps are positioned on tops of the vertical posts for mounting the horizontal toprails and the lightning cables thereto. The mounting brackets are positioned over or around the lightning cables and cinched against the caps so that the lightning cables are secured to the caps. The lightning cables extend from the caps, down the vertical posts, and to an electrical ground on or in the elevated surface.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
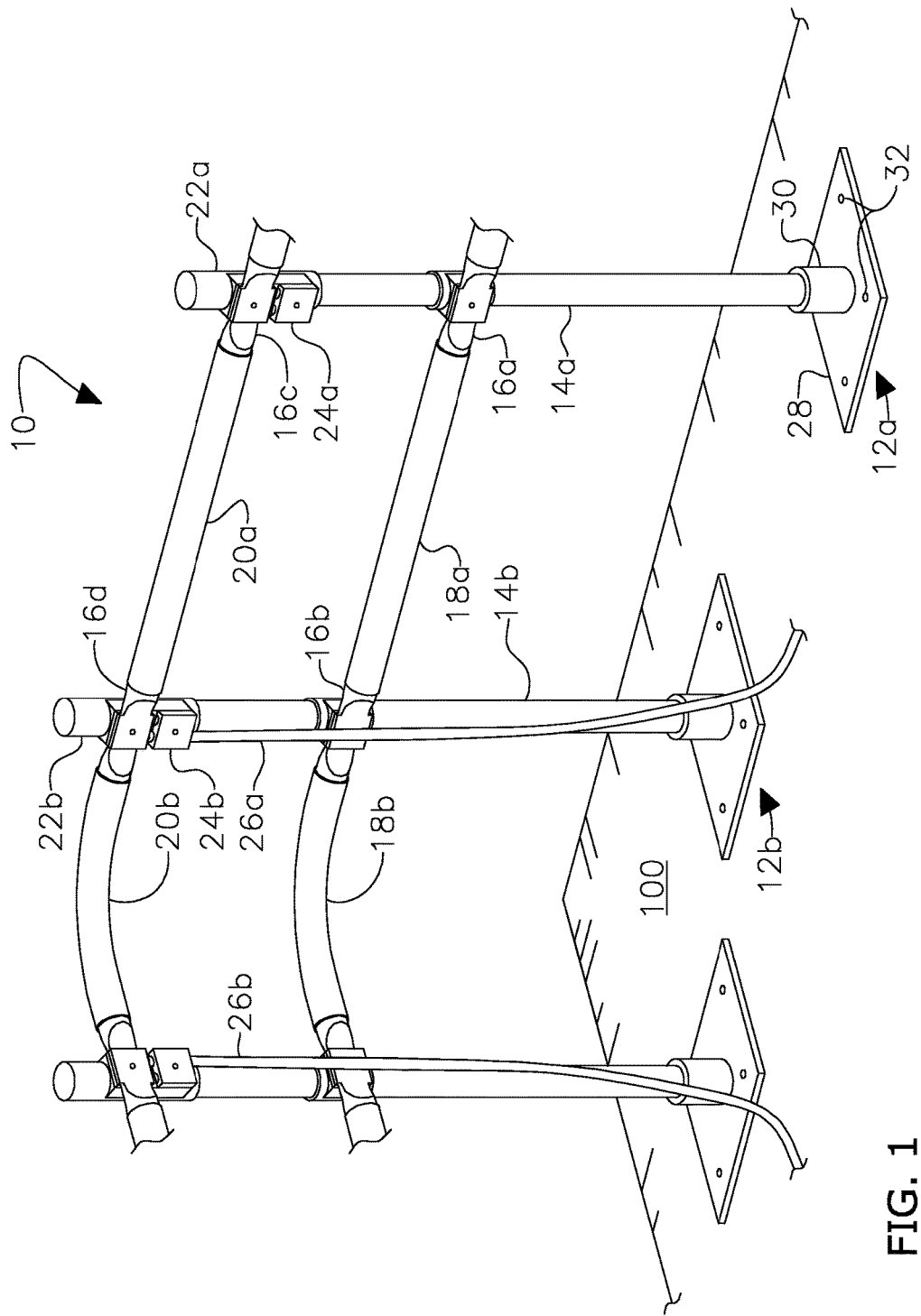
FIG. 1 is a perspective view of a lightning protection and safety rail system constructed in accordance with an embodiment of the invention.

The drawing figures do not limit the current invention to the specific embodiments disclosed and described herein. The drawings are not necessarily to scale, emphasis instead being placed upon clearly illustrating the principles of the present invention.

DETAILED DESCRIPTION OF THE EMBODIMENTS

The following detailed description of the present invention references the accompanying drawings that illustrate specific embodiments in which the present invention can be practiced. The embodiments are intended to describe aspects of the present invention in sufficient detail to enable those skilled in the art to practice the present invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
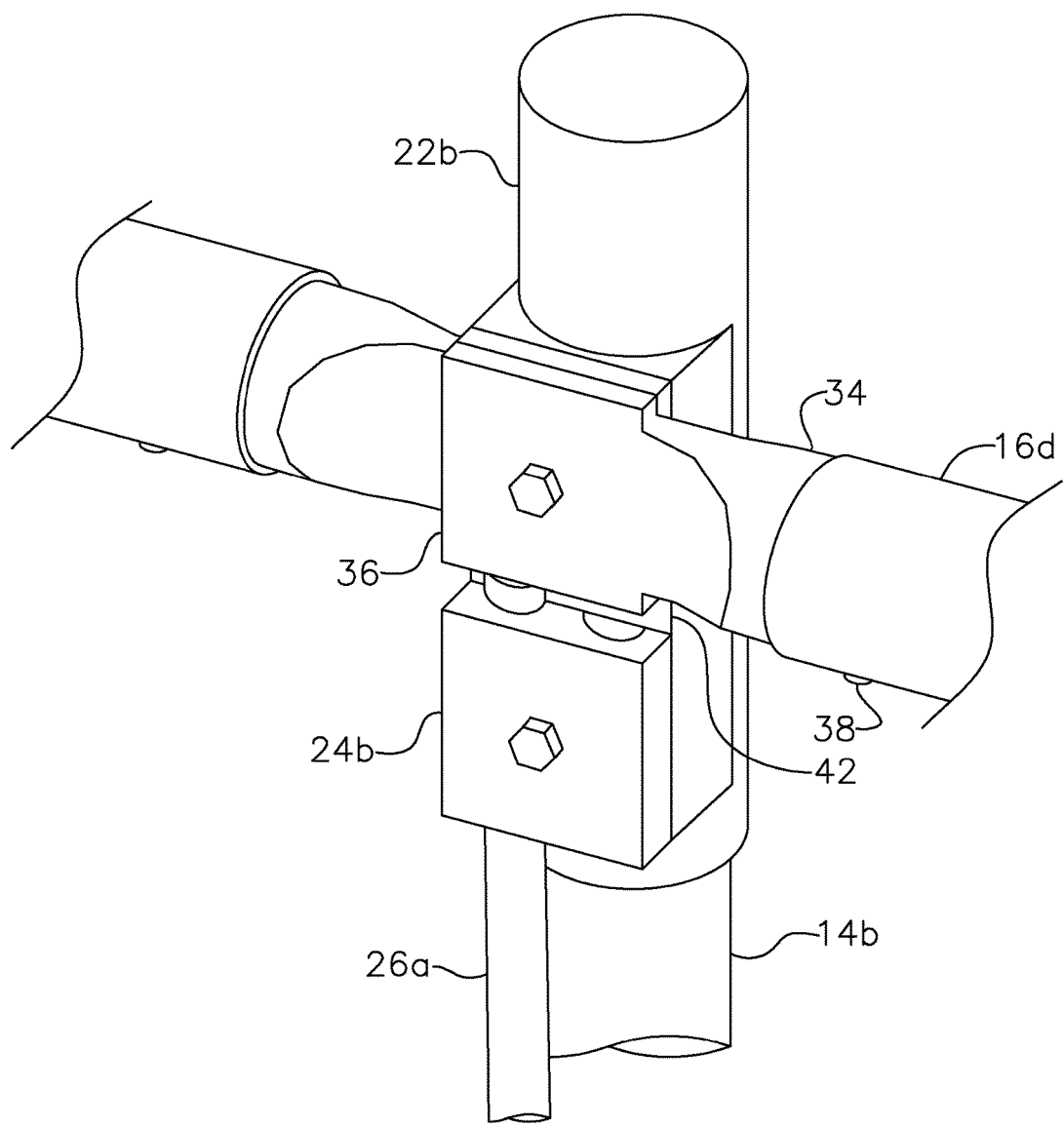
FIG. 2 is an enlarged view of a portion of the lightning protection and safety rail system of FIG. 1.
Figure 3:
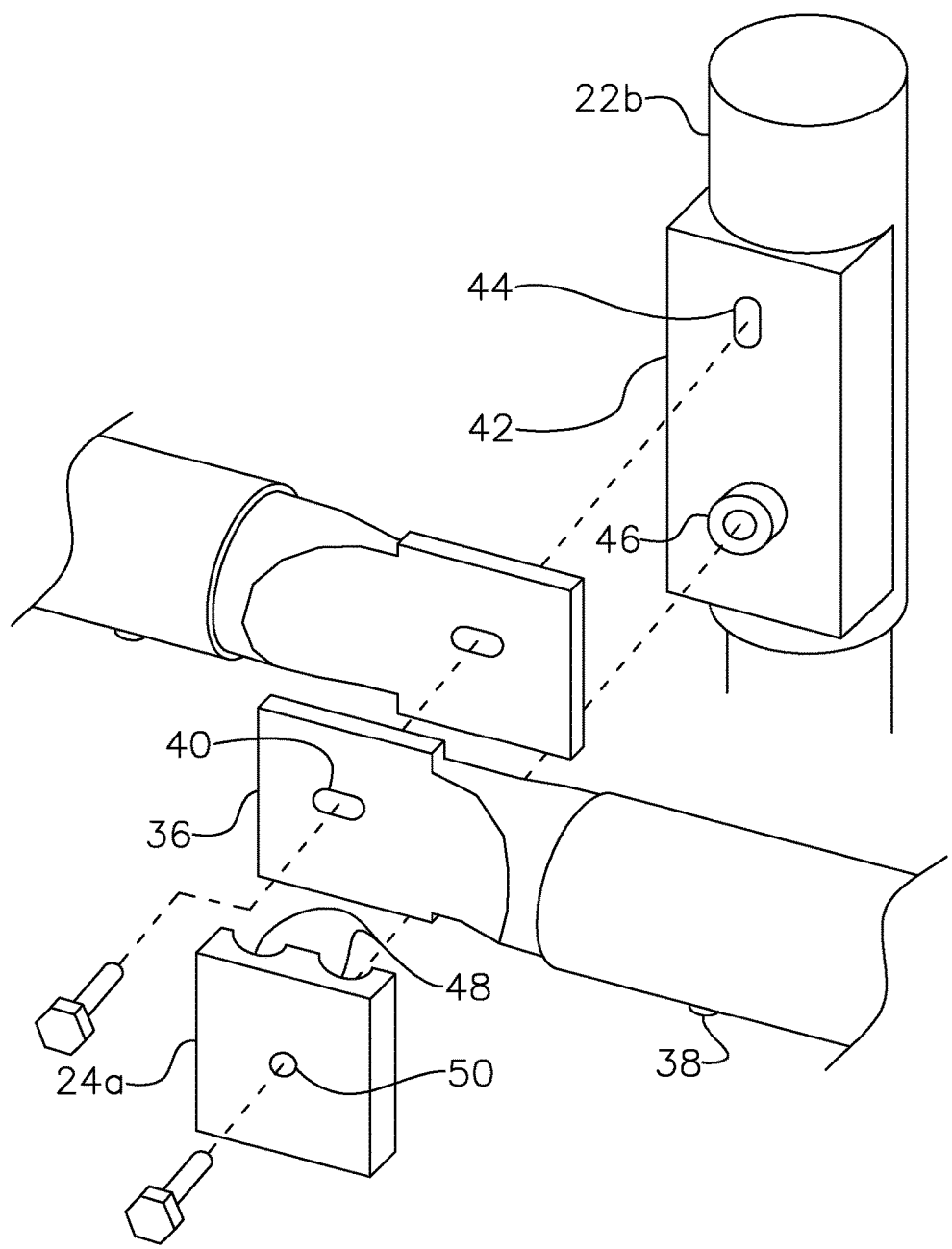
FIG. 3 is an exploded view of a portion of the lightning protection and safety rail system of FIG. 1.

Turning to FIGS. 1-3, embodiments of the present invention are directed to a lightning protection and safety rail system 10. The lightning protection and safety rail system 10 is configured to be mounted on a rooftop surface 100 or other elevated surface for guarding a hazardous edge or hazardous area and for safely channeling lightning current to an electrical ground. The lightning protection and safety rail system 10 includes a plurality of bases 12*a,b*, a plurality of vertical posts 14*a,b*, a plurality of connectors 16*a-d*, a plurality of horizontal midrails 18*a,b*, a plurality of horizontal toprails 20*a,b*, a plurality of caps 22*a,b*, a plurality of mounting brackets 24*a,b*, and a plurality of lightning cables 26*a,b*.

The bases 12*a,b* anchor the lightning protection and safety rail system 10 to the surface 100 and are formed of aluminum, steel, or other suitable material. Each base 12*a,b* includes a foot 28 and a receiver 30. The foot 28 may be a plate, a flange, or other shape and includes a plurality of holes 32 for receiving fasteners therethrough. The receiver 30 extends from the foot 28 and includes geometry for receiving a bottom of one of the vertical posts 14*a,b*. The receiving geometry may be a hole, slot, sleeve, tube, cylinder, or other shape. Alternatively, the vertical posts 14*a,b* may be welded or connected directly to the foot 28.

The vertical posts 14*a,b* extend upward from the bases 12*a,b* for supporting the horizontal rails 18*a,b* and 20*a,b* and are formed of aluminum, steel, or other suitable material. The vertical posts 14*a,b* may be tubes, pipes, bars, or other elongated structural member. The vertical posts 14*a,b* may include midrail connection points for connecting the horizontal midrails 18*a,b* to middle portions of the vertical posts 14*a,b*. The connection points may be holes, protrusions, clamps, or other fasteners or connectors.

The connectors 16*a,b* connect ends of the horizontal midrails 18*a,b* to the midrail connection points and the connectors 16*c,d* connect ends of the horizontal toprails 20*a,b* to the caps 22*a,b* described below. The connectors 16*a-d* are formed of aluminum, steel, or other material capable of conducting lightning current therethrough and each include a cylindrical portion 34 and a flange 36. The cylindrical portion 34 is inserted into or slid over an end of one of the horizontal rails 18*a,b*, 20*a,b*, and may include a set screw 38 or other fastener for securing the cylindrical portion 34 to the horizontal rail. The flange 36 is configured to be attached to a mounting surface of one of the vertical posts 14*a,b* or to be attached to a mounting surface of one of the caps 22*a,b* and includes a hole or slot 40 for inserting a fastener therethrough.

The horizontal midrails 18*a,b* add rigidity to the lightning protection and safety rail system 10 and prevent individuals from accidentally going past the system 10 below the horizontal top rails 20*a,b*. The horizontal midrails 18*a,b* are formed of aluminum or steel and may be tubes, pipes, bars, or other elongated straight or curved structural members extending between middle portions of the vertical posts 14*a,b*. The ends of the horizontal midrails 18*a,b* are inserted into or slid over the cylindrical portion 34 of the connectors 16*a,b*.

The horizontal toprails 20*a,b* add rigidity to the lightning protection and safety rail system 10 and prevent people from accidentally going past the system 10 above the horizontal midrails 18*a,b*. The horizontal toprails 20*a,b* also provide an electrical path for the lightning to travel to the lightning cables 26*a,b*. The horizontal toprails 20*a,b* are formed of aluminum, steel, or other suitable material and may be tubes, pipes, bars, or other elongated straight or curved structural members extending between top portions of the vertical posts 14*a,b*. The ends of the horizontal toprails 20*a,b* are inserted into or slid over the cylindrical portion 34 of the connectors 16*c,d*.

The caps 22*a,b* provide an anchor point for the horizontal toprails 20*a,b* and the lightning cables 26*a,b* and are positioned on a top of the vertical posts 14*a,b*. The caps 22*a,b* are formed of aluminum, steel, or other suitable material capable of conducting lightning current therethrough and may have a rounded, flat or contoured shape at its top. The caps 22*a,b* each include a mounting surface 42 that includes mounting holes or slots 44 and/or mounting bosses 46 for connecting one of the flanges 36 of the connectors 16*c,d* to the cap and for connecting one of the mounting brackets 24*a,b* to the cap.

The mounting brackets 24*a,b* secure the lightning cables 26*a,b* to the caps 22*a,b* and are formed of aluminum, steel, or any other suitable material. The mounting brackets 24*a,b* each include a number of contours 48 and a mounting hole 50. The contours 48 are arcuate for generally conforming to an outer shape of the lightning cables 26*a,b* and may be partitioned into two sections for conforming to two lightning cables. The mounting hole 50 is provided for inserting a fastener therethrough for fastening the mounting brackets 24*a,b* to the caps 22*a,b*.

The lightning cables 26*a,b* transfer lightning current from the caps 22*a,b* to an electrical ground and are twisted or braided electrical cables. The lightning cables 26*a,b* are cradled in the contours 48 of the mounting brackets 24*a,b* and cinched between the mounting brackets 24*a,b* and the caps 22*a,b*. The lightning cables 26*a,b* may also at least partially be routed through inner portions of the vertical posts 14*a,b* so that the lightning cables 26*a,b* are at least partially concealed.

Lightning striking the lightning protection and safety rail system 10 will hit one or more of the caps 22*a,b* or one of the horizontal toprails 20*a,b* and will travel through the caps 22*a,b* to one of the lightning cables 26*a,b*. The lightning will continue down through one or more of the lightning cables 26*a,b* to the electrical ground. If the lightning hits a cap that does not have one of the lightning cables 26*a,b* attached to it, the lightning will travel horizontally through one of the horizontal toprails 20*a,b* to a cap that has one of the lightning cables 26*a,b* attached to it. For example, the lightning will travel through the cap, through a connector connected to the cap, through the horizontal toprail 20*a*, through the connector 16*a*, through the cap 22*a*, and down through the lightning cable 26*a*. In this way, only a fraction of the caps need a lightning cable 26*a,b* attached to them.

Embodiments of the invention such as the above-described lightning protection and safety rail system 10 enable a building or other structure to have fall protection and lightning protection without the building owner or other entity requiring the individual specification, design, purchase, and installation of a lightning protection system and safety rail system. The lightning protection and safety rail system 10 thus saves the building owner or other entity thousands of dollars and hundreds of labor hours.

Figure 4:
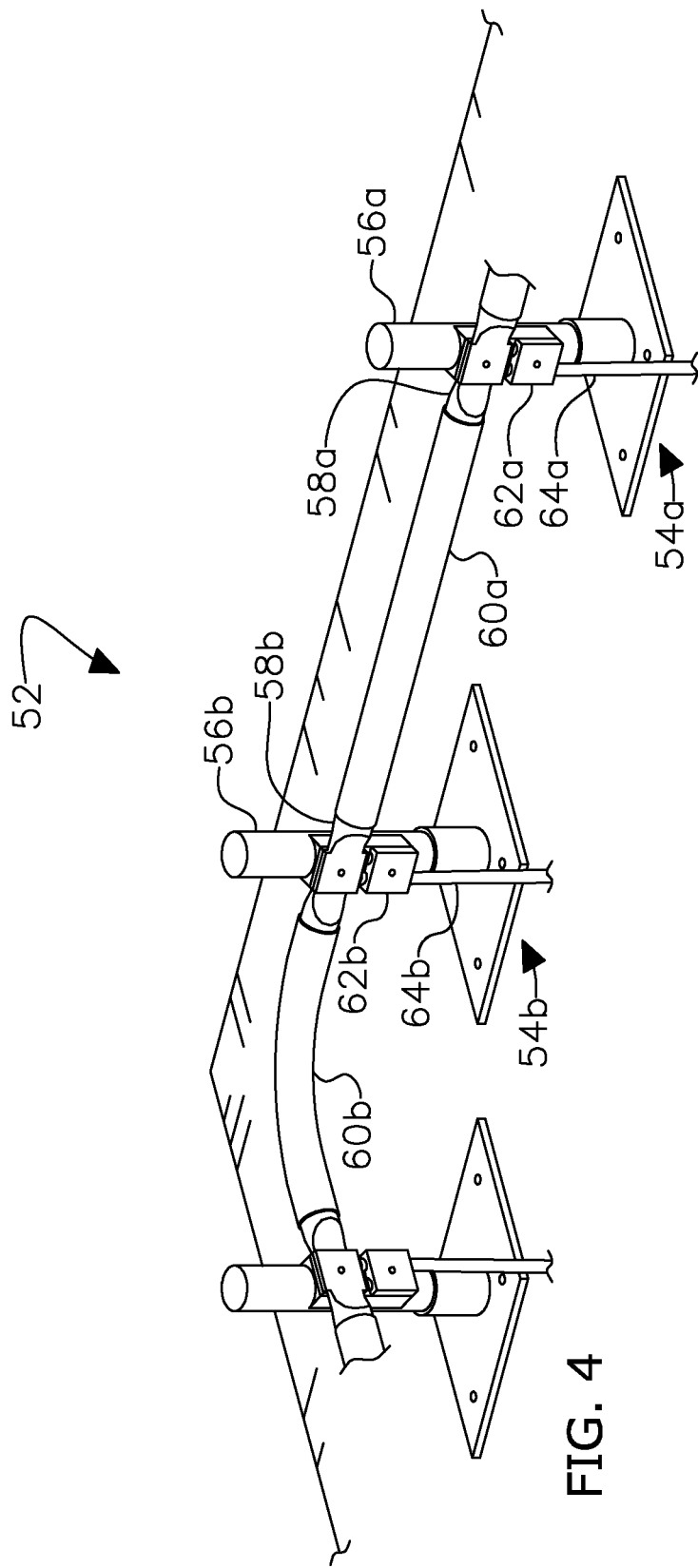
FIG. 4 is a perspective view of a lightning protection system constructed in accordance with another embodiment of the invention.

Turning to FIG. 4, another embodiment of the present invention is directed to a lightning protection system 52. The lightning protection system 52 is configured to be mounted on a rooftop surface 200 similar to the rooftop surface 100 or other elevated surface or structure for safely channeling lightning current to an electrical ground. The lightning protection system 52 includes a plurality of bases 54*a,b*, a plurality of caps 56*a,b*, a plurality of connectors 58*a,b*, a plurality of horizontal rails 60*a,b*, a plurality of mounting brackets 62*a,b*, and a plurality of lightning cables 64*a,b*.

The components of the lightning protection system 52 are constructed essentially the same as the corresponding components of the lightning protection and safety rail system 10 described above.

The lightning protection system 52 allows for the lightning cables 64*a,b* to be easily installed at various locations and provides an attractive high point (caps 56*a,b*) for lightning to be channeled through. The lightning protection system 52 also provides a safe high point that is not sharp or dangerous to workers or other personnel.

Lightning striking the lightning protection and safety rail system 52 will hit one or more of the caps 56*a,b* or one of the horizontal rails 60*a,b* and will travel through the caps 56*a,b* to one of the lightning cables 64*a,b*. The lightning will continue down through one or more of the lightning cables 64*a,b* to the electrical ground. If the lightning hits a cap that does not have one of the lightning cables 64*a,b* attached to it, the lightning will travel horizontally through one of the horizontal rails 60*a,b* to a cap that has one of the lightning cables 64*a,b* attached to it. In this way, only a fraction of the caps need a lightning cable 64*a,b* attached to them.

Although the present invention has been described with reference to the embodiments illustrated in the attached drawing figures, it is noted that equivalents may be employed and substitutions made herein without departing from the scope of the present invention as recited in the claims.

Having thus described various embodiments of the present invention, what is claimed as new and desired to be protected by Letters Patent includes the following:

1. A lightning protection and safety rail system for grounding lightning and for preventing falls, the lightning protection and safety rail system comprising:
    at least two bases for anchoring the lightning protection and safety rail system;
    at least two vertical posts extending from the bases;
    at least one horizontal rail extending between the vertical posts;
    a cap positioned at a top of one of the vertical posts for connecting a lightning cable to the cap for carrying lightning current from the cap to an electrical ground, wherein the cap includes a mounting surface having a first anchor point for the at least one horizontal rail and a second anchor point for the lightning cable; and
    a mounting bracket configured to be connected to the cap via a fastener for securing the lightning cable to the cap, wherein the mounting bracket includes a contour for conforming to an outer surface of the lightning cable.

2. The lightning protection and safety rail system of claim 1, further comprising:
    a first connector configured to be attached to a first end of the horizontal rail and attached to the cap via a fastener; and
    a second connector configured to be attached to a second end of the horizontal rail opposite the first end and attached to a cap on another one of the vertical posts via a fastener.

3. The lightning protection and safety rail system of claim 2, wherein each connector includes a cylindrical portion for connecting to the horizontal rail and a flange for connecting to one of the vertical posts.

4. The lightning protection and safety rail system of claim 3, wherein the ends of the horizontal rail are inserted into the cylindrical portions.

5. The lightning protection and safety rail system of claim 3, wherein the flanges are configured to be connected to a flange of another vertical post.

6. The lightning protection and safety rail system of claim 1, wherein the mounting bracket includes an additional contour for conforming to an outer surface of another lightning cable.

7. A lightning protection and safety rail system for grounding lightning and for preventing falls, the lightning protection and safety rail system comprising:
    at least two bases for anchoring the lightning protection and safety rail system;
    at least two vertical posts extending from the bases;
    at least one midrail extending between the vertical posts;
    at least one horizontal rail extending between the vertical posts;
    a first cap positioned at a top of one of the vertical posts;
    a second cap positioned at a top of another one of the vertical posts, wherein the first cap and the second cap include a mounting surface having a first anchor point for the at least one horizontal rail and a second anchor point for a lightning cable; and
    a mounting bracket configured to be connected to the first cap via a fastener for securing the lightning cable between the mounting bracket and the first cap, wherein the mounting bracket includes a contour for conforming to an outer surface of the lightning cable;
    the horizontal rail being configured to carry lightning current therethrough so that lightning hitting the second cap travels from the second cap, through the horizontal rail, to the first cap, through the lightning cable to an electrical ground.

8. The lightning protection and safety rail system of claim 7, further comprising:
    a first connector configured to be attached to a first end of the horizontal rail and attached to the cap via a fastener; and
    a second connector configured to be attached to a second end of the horizontal rail opposite the first end and attached to a cap on another one of the vertical posts via a fastener.

9. The lightning protection and safety rail system of claim 8, wherein each connector includes a cylindrical portion for connecting to the horizontal rail and a flange for connecting to one of the vertical posts.

10. The lightning protection and safety rail system of claim 9, wherein the ends of the horizontal rail are inserted into the cylindrical portions.

11. The lightning protection and safety rail system of claim 9, wherein the flanges are configured to be connected to a flange of another vertical post.

12. The lightning protection and safety rail system of claim 7, wherein the mounting bracket includes an additional contour for conforming to an outer surface of another lightning cable.

13. A lightning protection system for grounding lightning, the lightning protection system comprising:
    a base;
    a cap attached to the base wherein the cap includes a mounting surface for connecting a lightning cable to the cap at a first anchor point and for connecting an at least one horizontal rail to the cap at a second anchor point for carrying lightning current from the cap to an electrical ground; and
    a mounting bracket configured to be connected to the cap for connecting the lightning cable between the mounting bracket and the cap, wherein the mounting bracket includes a contour configured to conform to a shape of the lightning cable.

14. The lightning protection system of claim 13, wherein a top of the cap is rounded.

* * * * *